United States Patent [19]
Martin et al.

[11] 3,739,550
[45] June 19, 1973

[54] ADSORBENT FOR DESULFURIZATION OF SULFUR DIOXIDE CONTAINING WASTE GASES

[75] Inventors: Kruel Martin, Essen-Bergerhausen; Dieter Zurawsky, Gladbeck; Harald Juntgen, Essen-Heisingen, all of Germany

[73] Assignee: Bergwerksverband GmbH, Essen, Germany

[22] Filed: Oct. 7, 1968

[21] Appl. No.: 765,690

[30] Foreign Application Priority Data
Oct. 6, 1967   Germany.................. P 16 19 840.6

[52] U.S. Cl. ..................... 55/73, 55/74, 23/178 S
[51] Int. Cl. ..................... B01d 53/04, C01h 17/51
[58] Field of Search ..................... 55/387, 74, 522, 55/73; 210/502, 510; 23/25, 178, 168, 178 S

[56] References Cited
UNITED STATES PATENTS

| | | | |
|---|---|---|---|
| 2,701,240 | 2/1955 | Bregar | 210/502 X |
| 3,327,859 | 6/1967 | Pall | 210/502 UX |
| 3,396,122 | 8/1968 | Brauer | 252/428 |
| 3,429,103 | 2/1969 | Taylor | 55/71 |
| 3,416,293 | 12/1968 | Alexander | 55/73 |
| 3,501,897 | 3/1970 | Helmen et al. | 55/73 |
| 3,300,280 | 1/1967 | Terminet | 23/3.1 |
| 3,318,662 | 5/1967 | Pauling | 23/168 |

Primary Examiner—Charles N. Hart
Attorney—Michael S. Striker

[57] ABSTRACT

A carbon containing adsorbent for the desulfurization of carbon dioxide containing waste gases is impregnated with a mixed catalyst, the catalyst comprising (a) a vanadium compound and (b) at least one compound of the elements potassium, lithium or barium. The catalyst has considerably improved regeneration values.

9 Claims, No Drawings

ADSORBENT FOR DESULFURIZATION OF SULFUR DIOXIDE CONTAINING WASTE GASES

BACKGROUND OF THE INVENTION

When $SO_2$-containing waste gases are desulfurized by means of carbon-containing adsorbents, it is well known that the sulfur dioxide is not adsorbed as such but that a catalytic oxidation of the $SO_2$ to $SO_3$ takes place at the surface of the adsorbent under the action of the air which is present in the waste gases. The $SO_3$ is then hydrated immediately after its formation to $H_2SO_4$ by means of the water vapor which is always present in the flue gas and is retained as such in the pores of the adsorbent. After saturation of the adsorbent with $H_2SO_4$ which occurs at a concentration between 60 and 80 weight percent in the pores, the sulfuric acid must again be removed from the adsorbent.

The desulfurization and consequent charging with sulfuric acid is followed up with a thermal treatment under exclusion of oxygen at a temperature from 400° to 600° C in order to effect a regeneration of the carbon-containing adsorbent. The sulfuric acid in this case is reduced to $SO_2$ as appears from the following equation

$$2\ H_2SO_4 + C \rightarrow 2\ SO_2 + CO_2 + 2\ H_2O.$$

There is thus obtained a desorption gas which is high in $SO_2$ and which in addition contains $CO_2$, $N_2$, water vapor and possibly some CO. The initial desulfurization activity of the material however deterioates substantially if the adsorbent is passed in this manner through several adsorption-desorption cycles.

SUMMARY OF THE INVENTION

The invention therefore has the object to maintain the activity of carbon-containing adsorbents which are charged at temperatures between 100° and 200° with $SO_2$ and $H_2SO_4$, respectively, and which are then subjected to regenerating treatments at temperatures between 400° and 600°C. A further objective is, if possible, to even increase the adsorption activity of the adsorbent.

These objects are solved by impregnating the carbon containing adsorbent with a mixed catalyst, the catalyst comprising (s) a vanadius compound and (b) at least one compound of the elements potassium, lithium or barium.

The catalyst may contain in addition compounds of the elements aluminum, chromium, silicon or titanium. It may also contain a phosphorous compound.

DESCRIPTION OF THE PREFERRED EMBODIMENTS

Any desired compounds of the listed elements may be used in the mixed catalyst. Where the compounds are in the form of water-soluble compositions, they are applied to the surface of the adsorbents from an aqueous solution. To the extent that they are not water-soluble, they are applied from an aqueous suspension. Preferably, this is done by spraying the solution or suspension onto the adsorbents or also by means of a vacuum impregnation. The impregnated adsorbent is then subjected to drying 110°110°C. As for the amounts of the compounds, it is preferred to use the vanadium compounds in an amount of 30–50 weight percent, while the compounds of the other elements may be used in an amount between about 50 and 70 weight per cent. However, other weight relations are also possible, such as 20 : 80 or 80 : 20. In the last case, the mixed catalyst will contain a comparatively large amount of vanadium compound.

The compound of the elements lithium, potassium or barium, that is at least one of these compounds, must be present in addition to the vanadium compound. Additionally, it is preferred to further have present at least one element of aluminum, chromium, silicon or titanium. These latter compounds may have an effect as dispersing media.

The amount of mixed catalyst is up to about 15 weight per cent relative to the untreated carbon-containing adsorbent. This amount is applied to the surface of the adsorbent. It is 1 to select the amounts in a manner that the final adsorbent contains the vanadium element in an amount of 2 weight per cent relative to the untreated adsorbent, and that the other elements are added in a relation, expressed in their gram atomic weights, of 1 : 1 : 1 to the vanadium, such that the relation, for instance, is V : K : Al = 50.95 : 39.096 : 29.97 (gram). Another feature of the invention is the possible addition of phosphorous compounds to the catalyst. The addition of phosphorus, for instance in the form of $(HPO_3)_n$, has an advantageous effect in regard to the use of the adsorbent since it inhibits the auto-oxidation of the adsorbent to a substantial extent, without imparing its desulfurization action.

The carbon-containing adsorbent may in the first place be active charcoal. It may also be a so-called semicoke made from peat, lignite or mineral coal or preoxidized mineral coal. The specifications of these adsorbents such as mean pore size and inner surface can be varied in a wide range.

The following examples will further illustrate the invention.

EXAMPLE 1

A flue gas of the composition of 0.3 vol-% $SO_2$, 3.0 vol-% $O_2$, 6.0 vol-% $H_2O$, and 90.7 vol-% $N_2$ was passed through a solid layer of 100 cm³ adsorbent in an amount of 80 liters per hour. The layer had a thickness of 50 cm, the residence time was 5 seconds. The adsorption temperature was 120°C. The concentration of $SO_2$ was then measured at the inlet and outlet from the adsorbent and the degree of activity or desulfurization of the adsorbent layer was ascertained for each given period of time from the difference of the two $SO_2$ values. The measure for the desulfurization activity was the time period during which the initial desulfurization degree which was assumed to be 100 percent had decreased to 90 percent. The limit value of the desulfurization therefore was 90 percent related to time (in hours).

After charging the adsorbent with $H_2SO_4$ up to this limit, the adsorbent was then reactivated in a gentle nitrogen flow for 4 hours at a temperature of 600°C.

The basic material of the adsorbent was a bituminous coal of a grain size between 1 and 2 mm that had been activated with water vapor up to a loss of 28 weight percent.

The mixed catalyst was formed by dissolving or suspending 4.6 g $NH_4VO_3$, 4.4 g $K_2SO_4$ and 6.6 g $Li_2SO_4$ in about 50 ml water. The solution or suspension was then applied, by spraying, to 94 g of carrier material. The material was subsequently dried at 110°C. The total contents of catalytically active chemicals relative to the untreated adsorbent material was as follows: 3.8 wt.-% $V_2O_5$, 2.6 wt.-% $K_2O$ and 3.9 wt.-% $Li_2O$.

The following Table proves that the initial activity decreases rapidly with the untreated adsorbent while with the treated adsorbent it even increases during the proceedings.

TABLE I limit value for desulfurization 90% (h)

| Number of adsorption-desorption cycles | Carrier material without catalyst | with catalyst: $V_2O_5$-$K_2O$-$Li_2O$ | $V_2O_5$-$K_2O$-$SiO_2$ |
|---|---|---|---|
| 1 | 10.5 | 11.7 | 12.3 |
| 2 | 8.0 | 7.3 | 13.3 |
| 3 | 6.2 | 15.6 | 14.2 |
| 4 | 4.4 | 12.3 | 14.0 |
| 5 | 3.3 | 11.7 | 14.7 |
| 6 | 4.2 | 12.2 | 14.6 |
| 7 | 4.2 | 13.4 | 14.7 |

EXAMPLE 2

A technical grade of active charcoal with a grain size of between 1 and 3 mm was impregnated with a mixed catalyst in the manner of Example 1, was charged with $H_2SO_4$ at 120°C and was thermally treated for reactivation with a gentle nitrogen flow for four hours at 400°C.

The following Table demonstrates that the activity (measured again with relation to the desulfurization limit value of 90 percent) was very small without a catalyst while it increased about 10 or 20 times after impregnation of the catalyst.

TABLE II

Limit value for desulfurization 90% (h.)

| Number of adsorption-desorption cycles | Without catalyst | Catalyst $V_2O_5$-$K_2O$-$TiO_2$ | $V_2O_5$-$K_2O$-$Al_2O_3$ | $V_2O_5$-$K_2O$-$Cr_2O_3$ | $V_2O_5$-$Li_2O$ |
|---|---|---|---|---|---|
| 1 | 0.5 | 6.4 | 8.4 | 9.0 | 6.8 |
| 2 | 0.8 | 10.3 | 13.7 | 13.8 | 6.8 |
| 3 | 0.6 | 8.8 | 13.9 | 14.0 | 6.3 |
| 4 | 0.6 | 8.3 | 13.1 | 13.1 | 6.2 |
| 5 | 0.5 | 8.3 | 11.8 | 12.5 | 6.2 |
| 6 | 0.5 | 8.3 | 14.4 | 12.2 |  |

EXAMPLE 3

A lignite, low-temperature coke that was activated with water vapor (burning loss 10 percent) was impregnated in the manner of Example 1 with a mixed catalyst comprising 1 wt.-% each of vanadium, lithium and phosphorus and was subjected to charging at 200°C with $H_2SO_4$ and reactivaton at 600°C. The following Table shows the negative effect of the adsorption temperature in regard to the desulfurization activity. The efficacy of the adsorbent is, however, substantially increased by adding the catalyst.

TABLE III limit value for desulfurization 90% (h)

| Number of adsorption-desorption-cycles | Carrier material without catalyst | Catalyst: $V_2O_5$-$Li_2O$-$P_2O_5$ |
|---|---|---|
| 1 | 5.8 | 9.1 |
| 2 | 4.3 | 7.0 |
| 3 | 2.2 | 5.9 |
| 4 | 1.7 | 4.6 |
| 5 | 1.1 | 4.6 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A process for increasing, maintaining or recuperating the activity of carbonaceous adsorbents, the said process comprising impregnating the adsorbent with a mixed catalyst, the said catalyst comprising
   a. a vanadium compound,
   b. at least one compound of an element selected from the group consisting of the elements potassium, lithium and barium,
   c. at least one compound selected from the group of elements aluminum, chromium, silicon and titanium, and
   d. at least one compound of phosphorus, wherein said vanadium compound comprises between 20 and 50 percent by weight of the total catalyst and wherein the balance of the other compounds in the catalyst comprises between 50 and 80 percent thereof and wherein the amount of vanadium is 2 percent by weight relative to the weight of the untreated adsorbent and wherein the different elements in the compounds of the catalyst are present in a relation of 1 : 1 as to each other element, expressed in gram atomic weights and then using the impregnated adsorbent in the desulfurization of sulfur dioxide containing gases; followed by subjecting the adsorbent thereafter to a thermal regeneration.

2. Process according to claim 1, wherein the vanadium compound is vanadium dioxide.

3. Process according to claim 1, wherein said compound at (b) is selected from the group consisting of lithium oxide and potassium oxide.

4. Process according to claim 1, wherein said compound at (c) is selected from the group consisting of aluminum oxide, chromic oxide and titanium oxide.

5. Process according to claim 1, wherein the compound at (d) is metaphosphoric acid.

6. Process according to claim 1, wherein said adsorbent is selected from the group consisting of active charcoal, semicoke and pre-oxidized bituminous coal.

7. The process of claim 1, wherein the desulfurization is carried out at a temperature of about 100°–200°C.

8. The process of claim 1, wherein the adsorbent is regenerated in a thermal regeneration at about 400°–600°C.

9. The process of claim 1, wherein the catalyst is applied to the surface of the adsorbent in the form of an aqueous solution or suspension in an amount up to 15 percent by weight relative to the weight of the untreated adsorbent.

* * * * *